Figure 10:
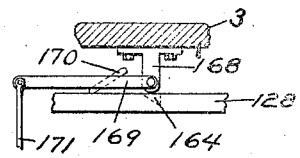

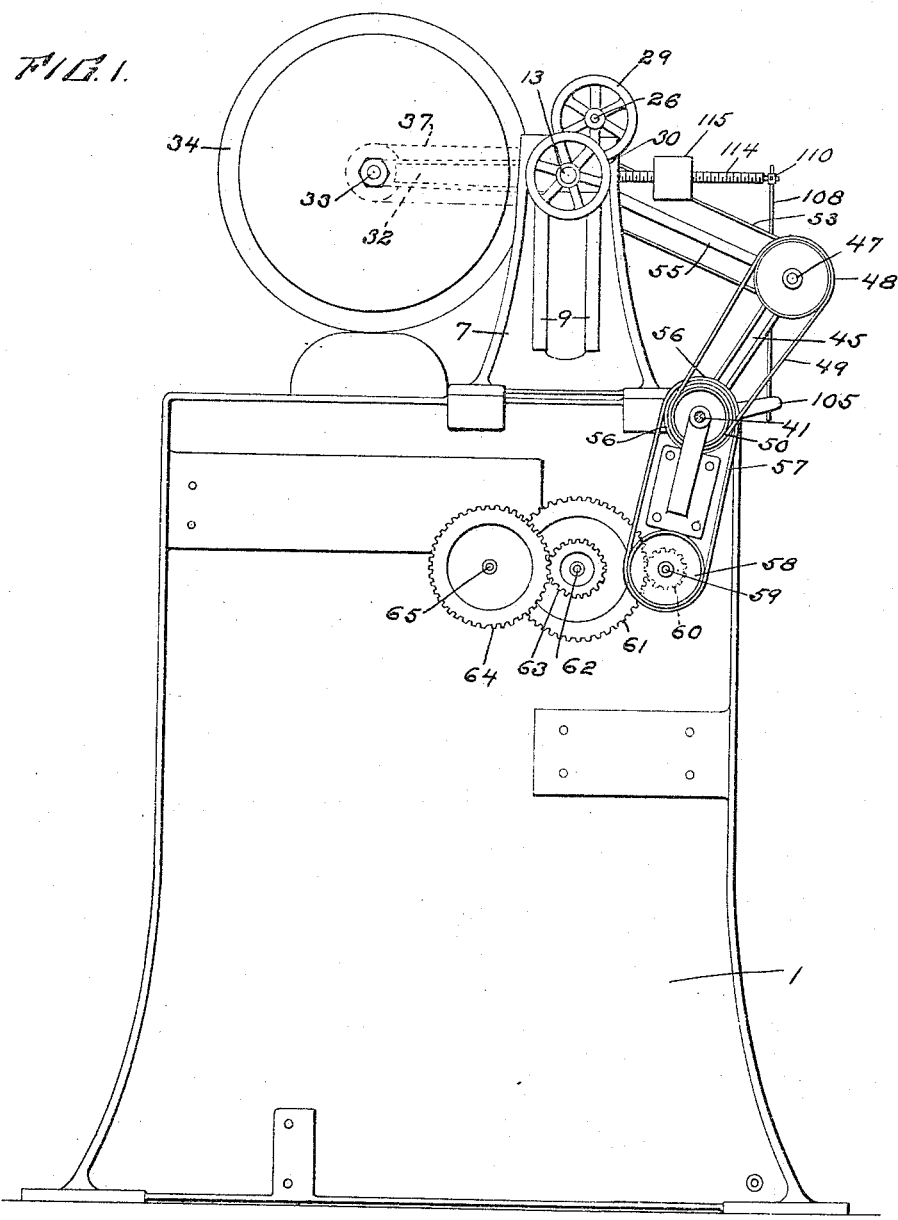

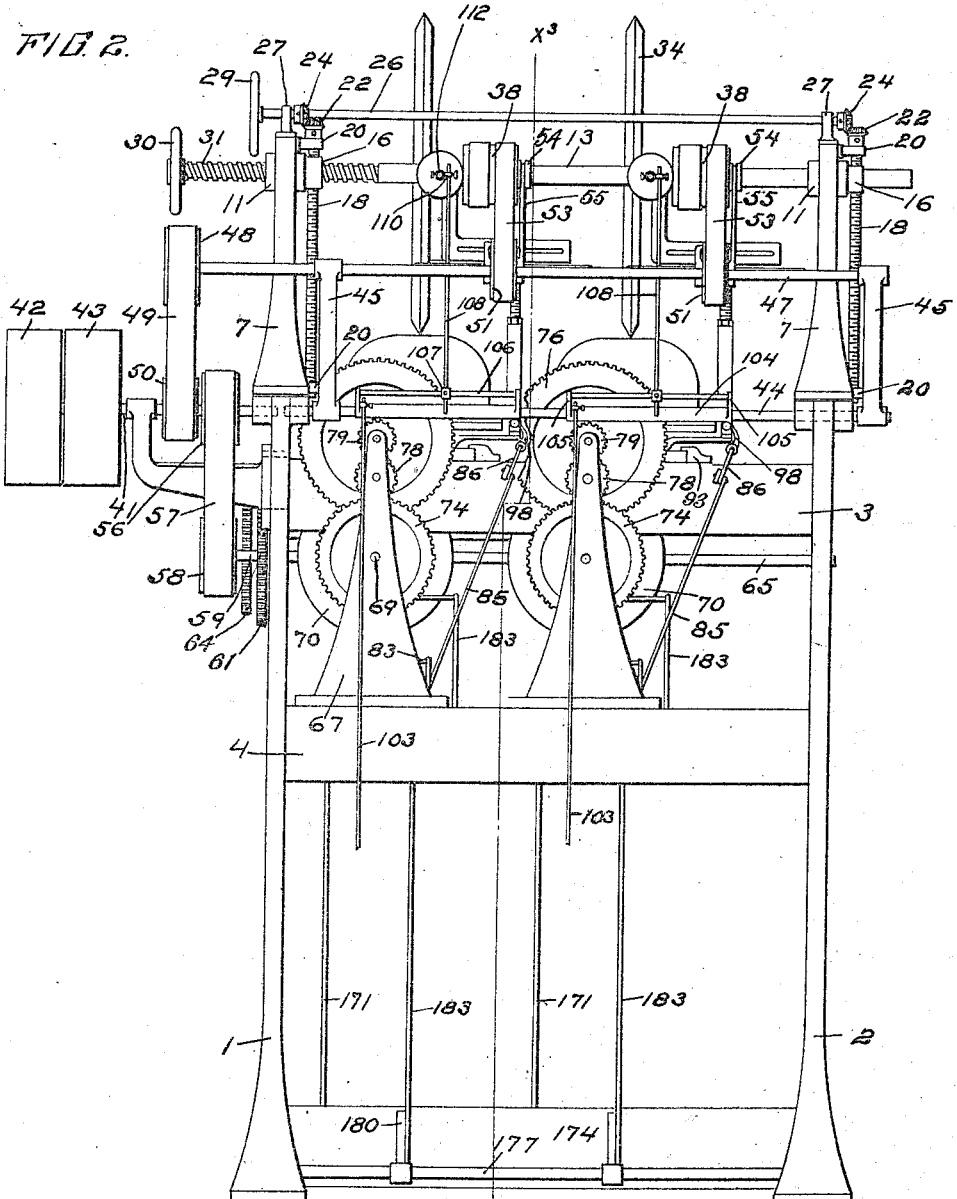

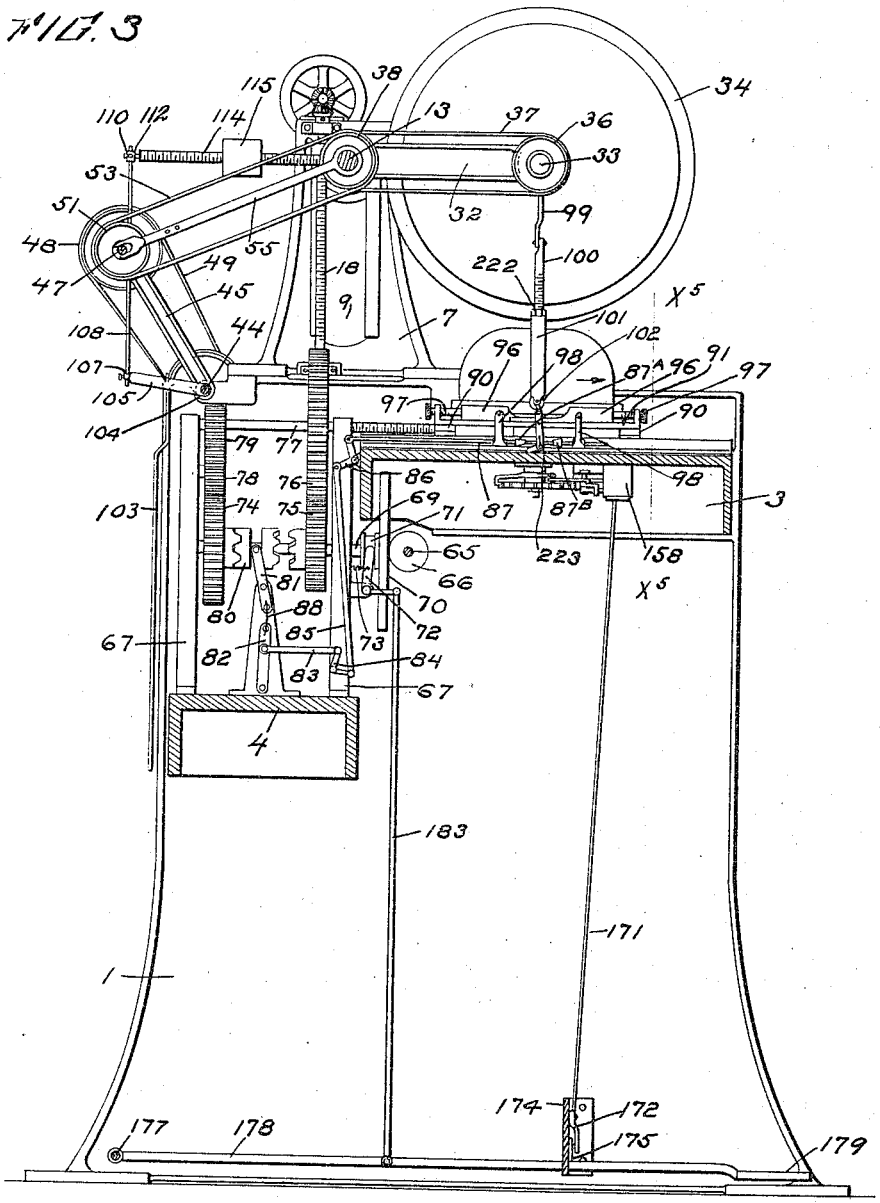

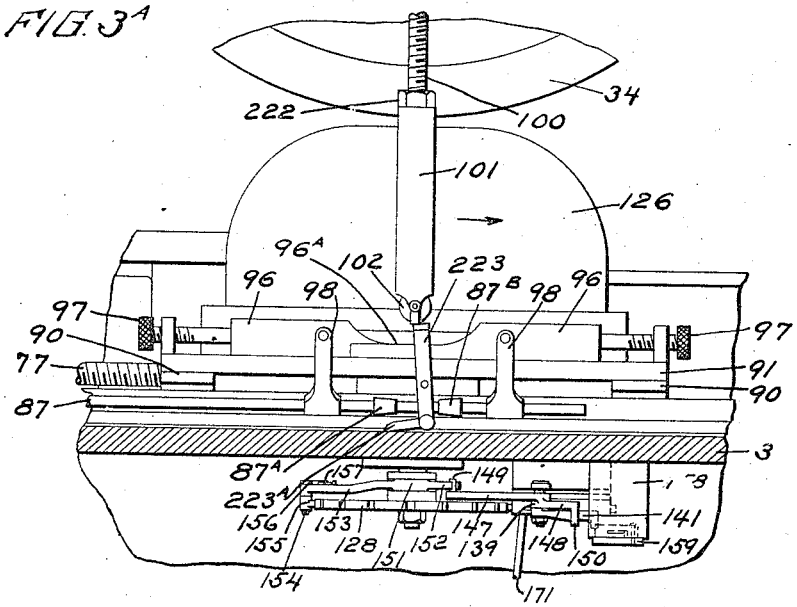
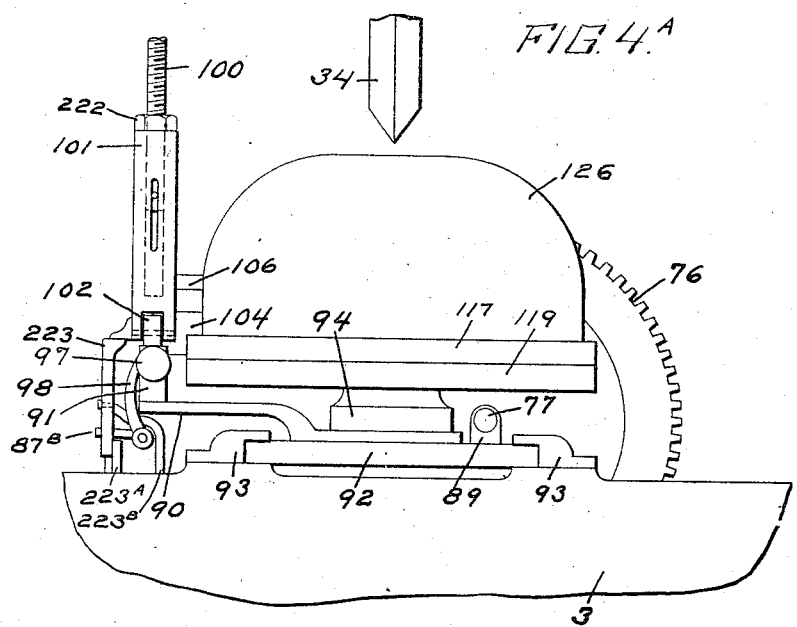

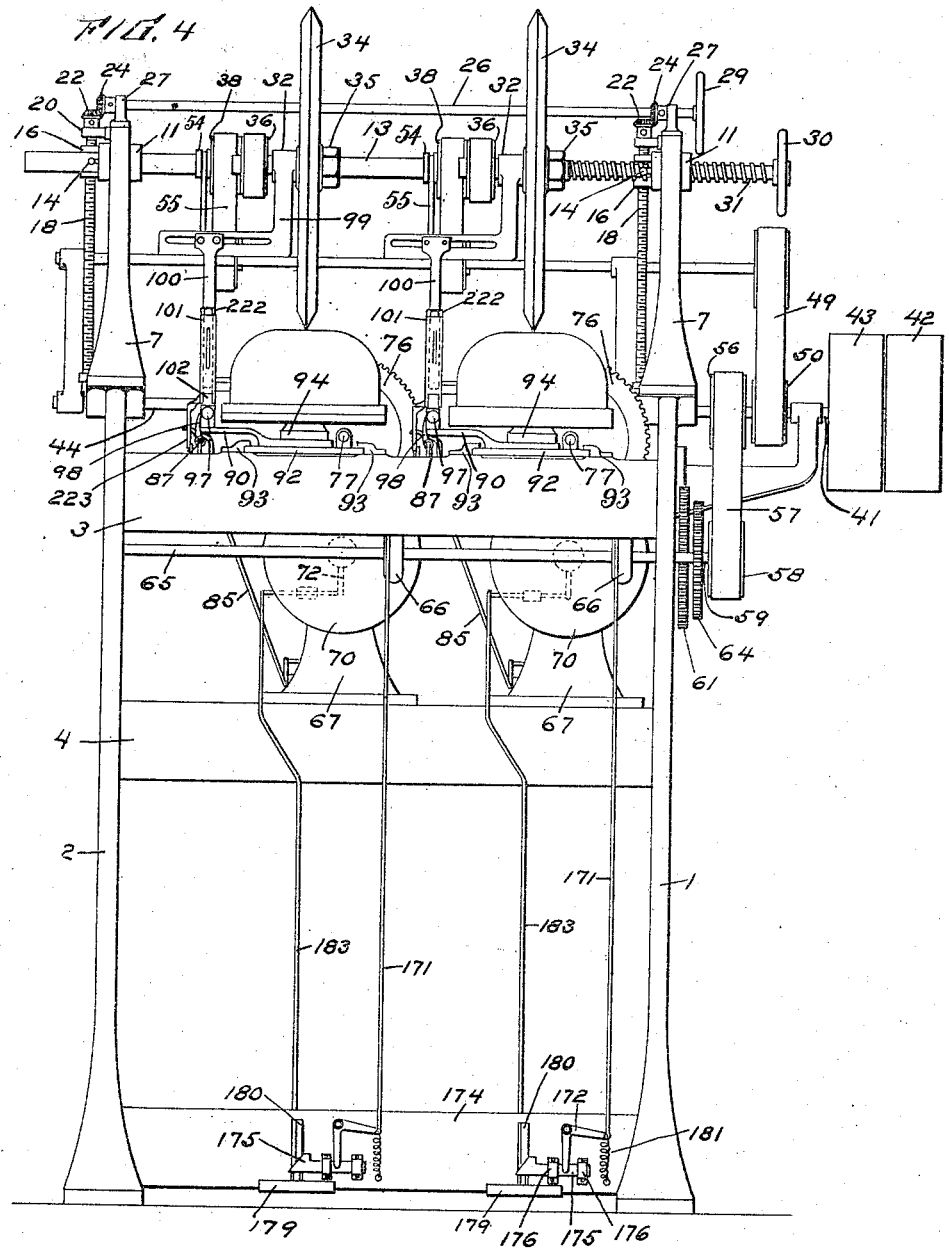

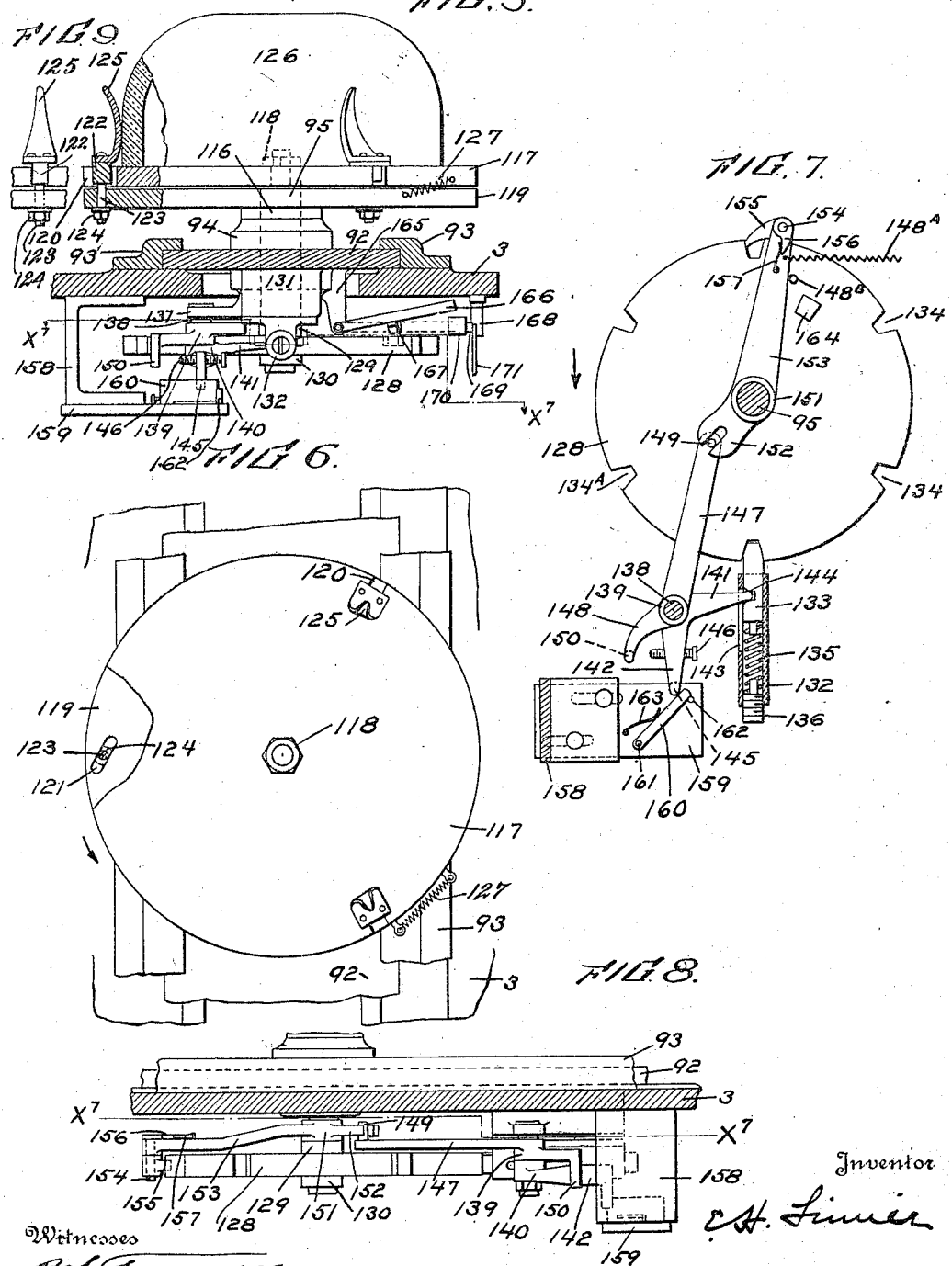

E. H. FINNIE.
MACHINE FOR MAKING CUT GLASS.
APPLICATION FILED SEPT. 14, 1914.

1,168,872.

Patented Jan. 18, 1916.
10 SHEETS—SHEET 7.

Witnesses
R. S. Trogner
Beatrice A. Sproe

Inventor
E. H. Finnie
By Dorsey Coe
his Attorneys

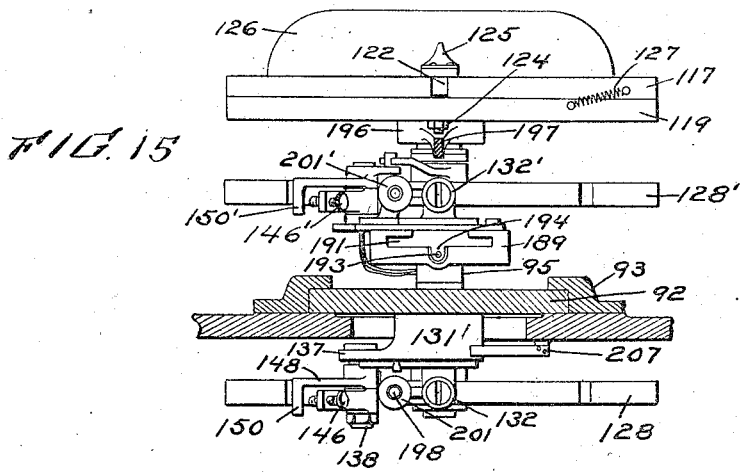
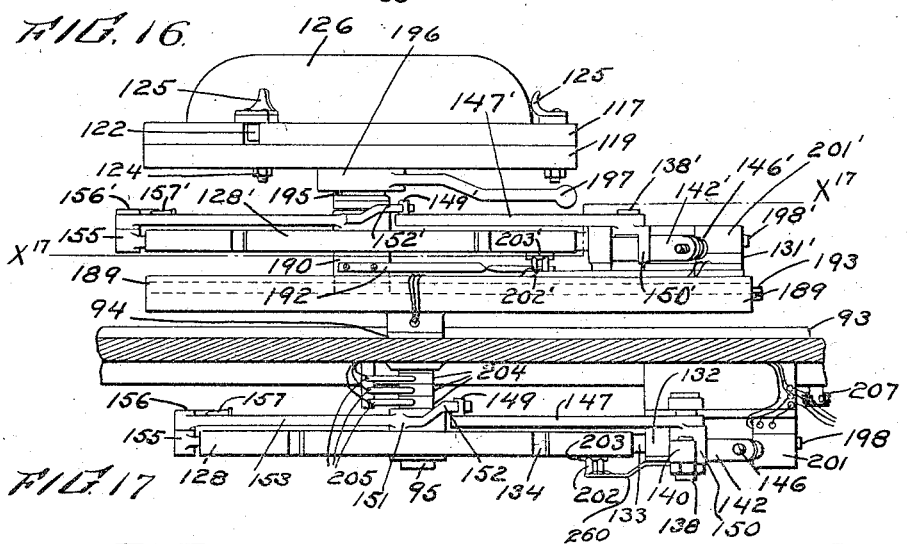
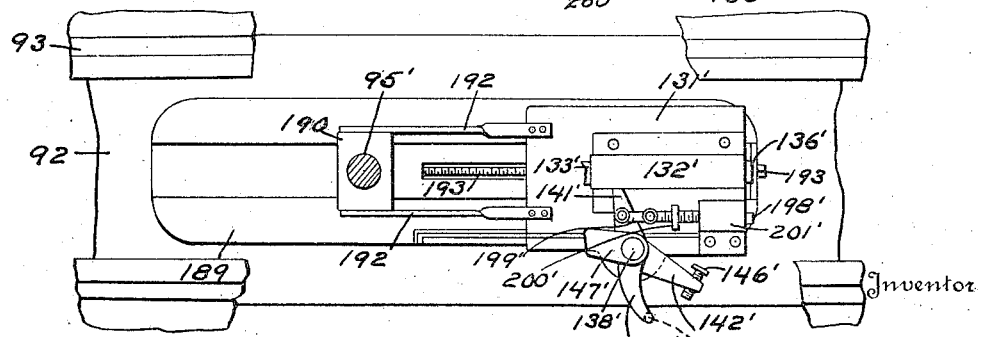

E. H. FINNIE.
MACHINE FOR MAKING CUT GLASS.
APPLICATION FILED SEPT. 14, 1914.
1,168,872.
Patented Jan. 18, 1916.
10 SHEETS—SHEET 9.
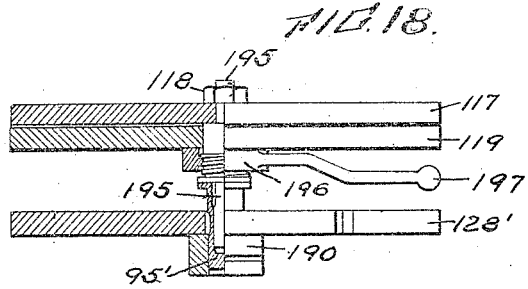
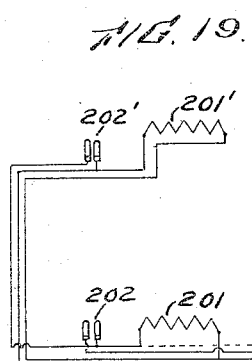
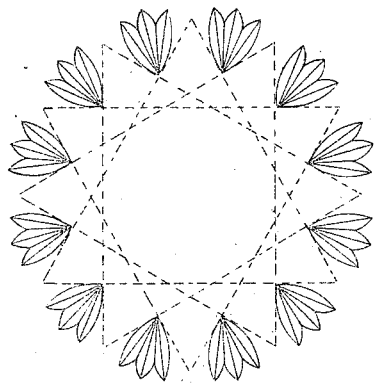
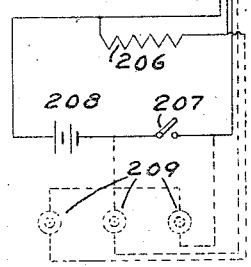
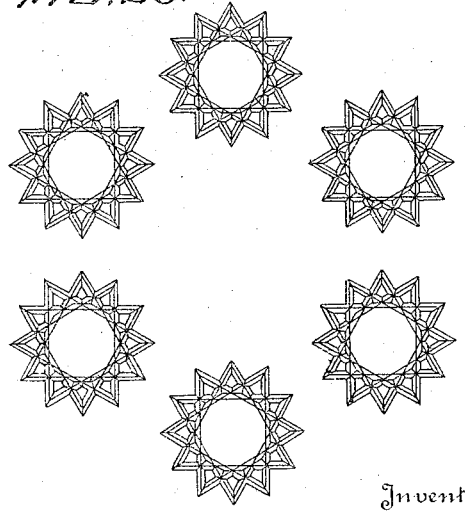
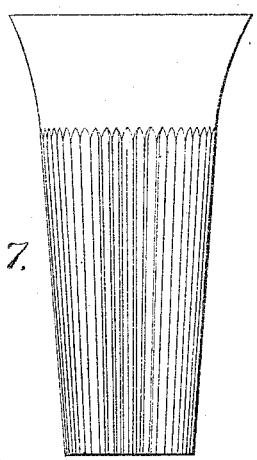
Witnesses
Inventor
E. H. Finnie
By Dorsey Cole
Attorneys

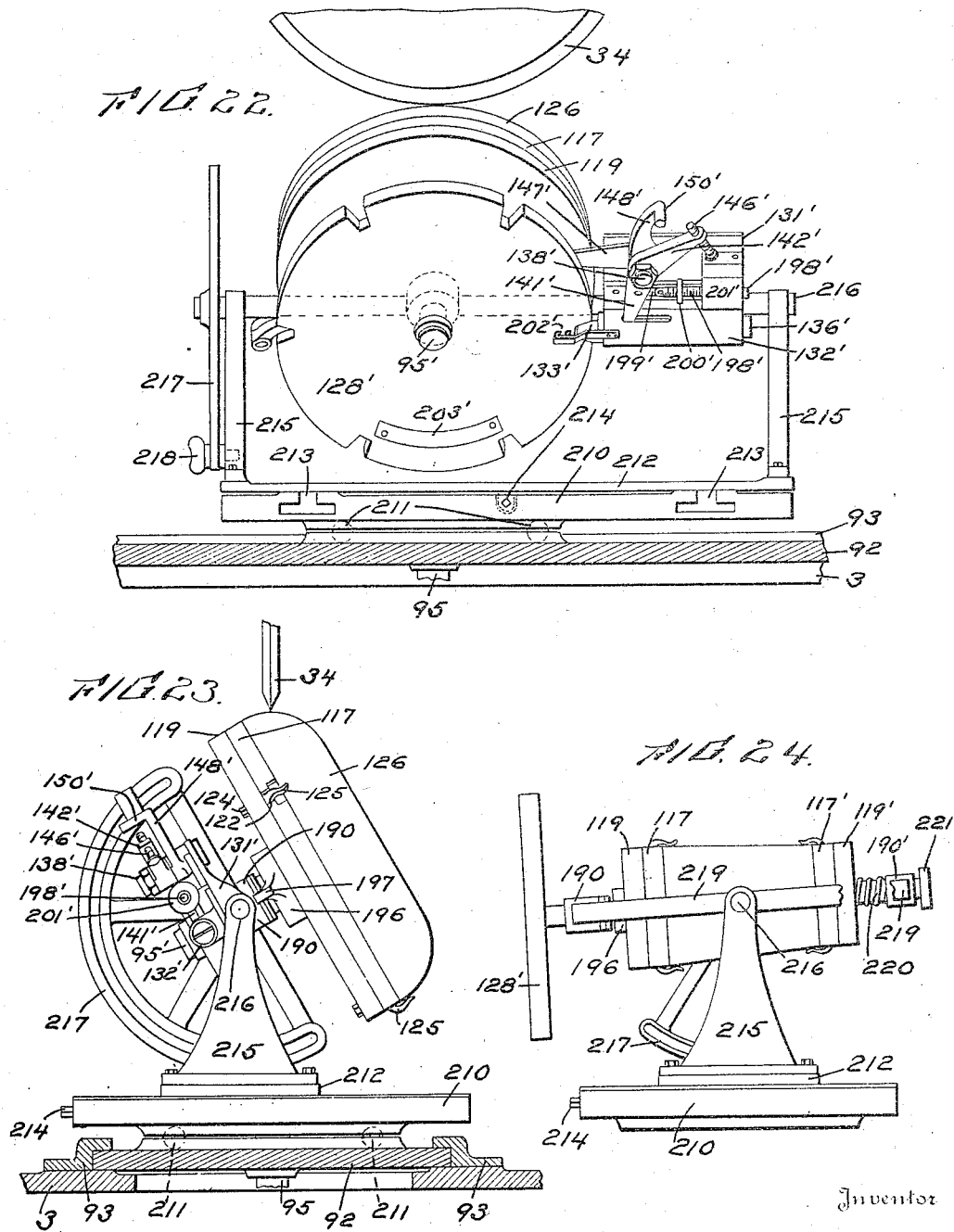

UNITED STATES PATENT OFFICE.

EDWIN HALDEMAN FINNIE, OF CORNING, NEW YORK.

MACHINE FOR MAKING CUT GLASS.

1,168,872. Specification of Letters Patent. Patented Jan. 18, 1916.

Application filed September 14, 1914. Serial No. 861,570.

*To all whom it may concern:*

Be it known that I, EDWIN HALDEMAN FINNIE, a citizen of the United States of America, and a resident of Corning, New York, have invented certain new and useful Improvements in Machines for Making Cut Glass, of which the following is a specification.

This invention has for its object the construction of a machine for cutting glass. With this end in view it comprises a blank carrier and a cutting mechanism, (the latter being specifically shown in the form of a revolving wheel), and means for reciprocating the one past the other, for automatically so changing such path of travel that the cut formed thereby may be angularly shifted according to a prearranged setting of the machine to make the desired design. By changes in the indexing mechanism different designs may be cut, or by leaving the indexing mechanism unchanged, the design may be repeated.

The machine here shown further embodies means whereby a quick automatic relative motion of the cutter and blank is accomplished whereby a design may be cut, not only consisting of a group of straight lines radial to the same point, but also consisting of a plurality of groups of lines, the lines of each group radiating from a common point, as well as designs consisting of parallel lines, or of a group of lines disposed at angles to each other or consisting of both parallel and converging lines, and of designs comprising a plurality of minor figures composed of any of the above groups. For this purpose it also embodies a form of blank holder by which not only is the blank disposed in proper angular relation to the cutting path but by which it may be shifted to properly locate thereon the minor figures formed by the several groups.

By the construction of this machine, the only attendance necessary thereon is to place the uncut blanks therein and to remove the finished article therefrom. Hence a single workman, who need not be a skilled glass cutter is enabled to serve several machines, or a machine embodying several units. By preference the machine is of the latter construction and I have in the accompanying drawing shown a machine embodying two units, but the number of these may be varied as desired, as such units are in no way interdependent upon each other.

My invention further consists of the construction, arrangement and combination of the several parts of which it is composed as will be hereinafter more fully described and claimed.

Figure 25:
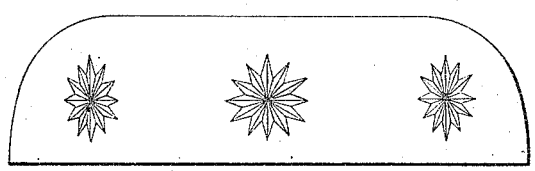
Figure 26:
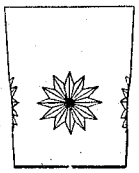

Referring to the accompanying drawings, in which corresponding parts are designated by corresponding marks of reference,—Figure 1 is an end elevation of the machine constructed in accordance with this invention. This figure is taken from what is the right hand side of the machine as here assembled and shows the main driving pulley removed. Fig. 2 is a rear elevation thereof. Fig. 3 is a vertical section on lines $X^3$—$X^3$ of Fig. 2, and Fig. $3^a$ is an enlarged view of the blank holding and indexing mechanism thereof. Fig. 4 is a front elevation, and Fig. $4^a$ is an enlarged view of a like portion thereof. Fig. 5 is a cross section of a part of one of the cutting units on the line $X^5$—$X^5$ of Fig. 3, showing details of the blank holder, indexing mechanism etc. Fig. 6 is a plan view of the parts shown in Fig. 5, but with the blank removed. Fig. 7 is a horizontal section of the lines $X^7$—$X^7$ of Figs. 5 and 8. Figs. 8, 9, and 10 are elevations of some of the parts shown in Fig. 5. Figs. 11, 12, 13, and 14 show some of the various designs that may be automatically cut by the machine herein described, and by the use of the indexing mechanism embodied in the foregoing figures. Fig. 15 shows a modified construction of indexing mechanism and blank-holder in sectional elevation, this view being similar to Fig. 5. Fig. 16 is an elevation thereof with one of the guides removed. Fig. 17 is a sectional view of the line $X^{17}$—$X^{17}$ of Fig. 16. Fig. 18 is a detail view of the blank-holder of this form of my invention. Fig. 19 is a diagrammatic view of the electric wiring of the parts shown in Figs. 15 to 17. Figs. 20 and 21 show two designs which may be automatically cut by the type of carrier last referred to. Fig. 22 is an elevation of another form of carrier whereby designs may be cut on portions of curved surfaces. Fig. 23 is a front elevation thereof. Fig. 24 is a front elevation of another carrier, the indexing mechanism thereof being omitted. Figs. 25, 26, and 27 show some of the designs and articles which may be cut with carriers of the type shown in Figs. 22 to 24.

*Detailed description.*—The frame of the machine consists of two standards 1 and 2 resting on a suitable base, and connected by two horizontal beds 3 and 4. At their upper ends the standards carry the pedestals 7. These pedestals have guide ways 9, in which slide the blocks 11, carrying the bar 13. These blocks are held firmly to the guide ways in any position by means of the set screws 14. They are also provided with internally threaded lugs 16, which engage the vertical worm shafts 18. The latter are supported by the bearings 20, attached to the pedestals 7 and carry bevel gears 22, at their upper ends. Enmeshed with these gears are the bevel gears 24 on the horizontal shaft 26, the latter being supported by the bearings 27 attached to the top of the pedestals 7. At one end of the shaft 26 is the hand wheel 29.

Fast to one end of the bar 13 is the handwheel 30, the bar having external threads 31 to fit corresponding internal threads of one of the blocks 11. This bar also carries one end of each of the arms 32, there being one arm for each cutting unit of the machine. The other end of each arm 32 supports a short shaft 33, to one end of which is fitted a cutting wheel 34, held in place by the nut 35, or by any other suitable means. The drawings show cutting wheels with miter or V-shaped edges, but it is understood that any shape of wheel may be used. At the other end of the shaft 33 is fastened a pulley 36 carrying the belt 37 which also passes over one end of the double faced pulley 38 carried by bar 13.

A shaft 41 is supported on the outside of the standard 1 and carries the tight and loose pulleys 42 and 43, the former being the main driving pulley of the machine. These pulleys may be driven by belt connection from any available source of power, or if desired they may be omitted, the shaft 41 being driven by an individual electric motor attached to the machine.

A shaft 44 is supported in bearings in the two standards 1 and 2, and has attached thereto the lower ends of radius arms 45. The shafts 41 and 44 are axial with each other but are separate and distinct and should not be confused. The upper ends of arms 45 serve as bearings for a shaft 47, attached to one end of which is a pulley 48 connected by belt 49 with a pulley 50 fast on the shaft 41. The shaft 47 has feathered thereon pulleys 51 (one for each cutting unit), each of these pulleys being connected to the corresponding double face pulley 38 on bar 13 by means of the belts 53. The double face pulley 38 carries a grooved collar 54, in the groove of which rests one end of a radius bar 55. The other end of this bar is bifurcated, the two forks straddling the pulley 51 and the ends of the forks bearing on the hubs thereof. The shaft 41 also has fastened to it a pulley 56 connected by a belt 57 with a pulley 58 on a shaft 59, which latter has fast thereon the pinion 60. The pinion 60 engages gear 61 on a shaft 62 which also carries a pinion 63, engaging a gear 64 on a shaft 65 which extends the length of the machine and is supported in bearings in the vertical standards 1 and 2.

On the shaft 65 are friction wheels 66 (one for each cutting unit) adjustably attached so that their position on the shaft may easily be changed. Arising from the bed 4 are pedestals 67 carrying bearings for shafts 69, one for each unit. At the front end of each of these shafts on a feather, is the friction disk 70 to which is attached a grooved collar 71, in which fits a bifurcated yoke 72, which forms one arm of a bell crank lever carried by a bearing on the pedestal 67. To the other arm of the lever is attached a rod 183. A spring 73 tends to keep the friction disks 66 and 70 out of contact, but when the cutting units are to be operated they are brought into contact by means of the rod 183 in a manner hereinafter described.

Each shaft 69 has sleeved thereon large and small gears 74 and 75. The latter engages a large gear 76 on a worm shaft 77 which is carried by bearings in the pedestals 67. Through a pinion 78, gear 74 drives a small pinion 79 also on the worm shaft 77. By means of a double clutch 80 (which may be of any desired type) one or the other set of gears is operated from the shaft 69, so that the screw 77 has either a slow speed in one direction or a high speed in the other. The clutch is operated through links, levers, and bell cranks, 81, 82, 83, 84, 85, and 86 by the rod 87 as hereinafter described. The rod carries two adjustable collars 87$^A$ and 87$^B$. A spring 88 is placed between the levers 81 and 82 to give a quick action to the clutch, the movement of the rod 87 being very slow.

The bed 3 is provided with horizontal ways (one for each cutting unit) on each of which travels a slide 92, held in alinement by the guides 93. Each slide has a vertical hub 94, the table being provided with openings through which the lower parts of these hubs pass. Each hub 94 forms a bearing for a vertical shaft 95, to the top of which is attached the blank holder and to the bottom the indexing mechanism, automatic stop and other parts. Each slide 92 has an internally threaded lug 89 engaged by the worm 77, by means of which the slide and attached parts are given a reciprocating motion as the clutch 80 is shifted from one position to the other.

On the shaft 44 are sleeves 104 (one for each cutting unit) having at each end an arm 105, to one of which arms is attached the vertical rod 103 connected to a pedal not shown in the drawings but placed in any convenient position. By pressing on this pedal so as to pull down on the rod 103, the operator can lift the cutting wheel clear of the blank at any time, by means of the following rigging.

The outer ends of the arms 105 carry a horizontal bar 106, on which slides a collar 107 provided with a hole through which the vertical rod 108 passes, the rod being adapted to be clamped in any position in the collar. The upper end of the rod passes through and is clamped in a similar collar 110, attached by a swivel joint to the collar 112 which is fastened to the outer end of the bar 114, which is an extension of the arm 32. The bar is threaded and on it is screwed the counterweight 115, which is thus adjustable to any position on the bar.

Referring to the detail views of the one form of the blank holder, rotating and indexing mechanism, etc., (see Figs. 5 to 10), it will be understood that these are individualized in respect to each unit. As shown in these figures, each vertical shaft 95 is supported in the hub 94 by a collar 116 attached to and forming a part of the shaft. Resting on another shoulder of the shaft 95 is a circular plate 117, held rigidly in place by a nut 118. Beneath this plate and fitting loosely on the shaft is a similar plate 119 supported by the collar 116. The plate 117 is provided with three radial slots 120 and the plate 119 with three slots 121, either straight or curved but cut at an angle to the radii of the plate. T-shaped blocks 122 closely fit the slots 120 and to the bottom of these blocks are attached pins 123 passing through the slots 121. Vertical movement of the blocks is prevented by the nuts 124 on the pins 123 and bearing on the under surface of the plate 119. To the top of the blocks 122 are detachably secured the fingers 125 which are of any convenient size and shape to hold the blank 126 which is to be cut. The spring 127 is attached to the plates 117 and 119 so that the latter is pulled in the direction of the arrow, Fig. 6.

By means of the oblique slots 121 the blocks 122 are pressed toward the center of the blank holder thus formed, along the radial slots 120, so that the fingers 125 are at all times held firmly against the blank. A blank is quickly inserted in the holder by pressing it down between the fingers 125 until it rests on the plate 117. All the parts of the blank holder being symmetrically arranged the blank is automatically centered over the axis of the shaft 95. In the figures referred to, a blank in the form of a bowl or dish is shown, but it is understood that the blank holder may be changed in detail to accommodate a blank of any shape, the principle of self-centering remaining the same.

On the lower end of the shaft 95 is the circular plate 128 fastened rigidly thereto between the collars 129 and 130. Carried by a bracket 131 depending from the lower face of the slide 92 is a hollow cylinder 132 in one end of which fits a plunger 133. The outer end of this plunger is squared and tapered to fit tapered radial slots 134 in the circumference of the plate 128. The plunger is held firmly in these slots by means of a compression spring 135 inside the cylinder 132. The other end of the spring bears against and the amount of its compression is adjusted by a plug 136 screwed into the outer end of the cylinder. The bracket 131 has a horizontal projection 137 in which is fastened the vertical pin 138. Fitting loosely on this pin are sleeves 139 and 140. The latter has projecting therefrom two arms 141 and 142, the former of which passes through a slot 143 in the cylinder 132 and engages a notch 144 in the plunger 133, and the latter of which carries a vertical pin 145 and a screw 146.

The sleeve 139 has two arms 147 and 148 at the outer ends of which are pins 149 and 150, respectively. Fitting loosely on the shaft 95 and resting on the collar 129 is a hub 151 having two arms 152 and 153. The former is slotted radially and in the slot fits pin 149 of arm 147. Through the outer end of arm 153 passes a vertical pin 154 to the bottom of which is attached a pawl 155 and to the top of which is attached a finger 156. By means of a spring 157 bearing against the finger 156, the pawl 155 is pressed inward, engaging one of the slots 134 in the plate 128. Suspended from the bed 3 is a bracket 158, adjustably fastened to which is a plate 159. This plate carries a vertical shutter 160 pivoted at one end on a pin 161. The shutter is normally held against a stop pin 162 by means of a spring 163 as shown in the drawings.

An automatic stop for arresting the functions of the machine upon the completion of a design is operated by means of the tapered slot 164 cut on an arc in the plate 128. The slide 92 carries a depending bracket 165 (shown only in Fig. 5) to which is pivoted one end of a bar 166 having an ear 167. Under normal conditions this ear rests on the surface of the plate 128 as shown by the solid lines in Fig. 5, but when the plate is rotated, as hereinafter described, until the slot 164 comes under the ear 167, the latter drops into it allowing the bar 166 to assume a horizontal position as shown by the dotted lines.

From the bed 3 depends a bracket 168 for each cutting unit, and to each bracket is pivoted one end of a lever 169. This lever carries an oblique projection 170 (see Fig. 10) which is engaged by the outer end of arm 166 when the latter is lowered to the position shown by the dotted lines. To the outer end of the lever 169 is attached a vertical rod 171, the lower end of which is attached to the horizontal arm of a bell crank lever 172 which is on a plate 174 extending the length of the machine and fastened at each end to the standards 1 and 2 (see Fig. 4). The vertical arm of the bell crank lever 172 has a pin which engages a horizontal latch 175, the latter sliding in bearings 176 attached to the plate 174.

At the rear of the machine and extending its length is a bar 177 fastened at each end to the standards 1 and 2. On this bar are pivoted the rear ends of levers 178, (one for each cutting unit), the front ends of which carry the pedals 179. Each lever passes through a slot 180 in the plate 174, and under normal conditions, bears against the under side of the corresponding latch 175, as shown in the drawings, the latch being held in this position by means of a spring 181, one end of which is attached to the plate 174 and the other end to the horizontal arm of the bell crank lever 172. To each lever 178 is pivoted the lower end of a vertical rod 183. The upper end of this rod is similarly attached to the lower end of lever 72, as described before. To each slide 92 are attached two brackets 90 carrying a horizontal bar 91 which supports two cam plates 96. These cam plates are independently adjustable by means of the screws 97 and each has an arm 98 ending in a collar through which passes the rod 87. Depending from the front hub of each arm 32 is a bracket 99 to which is adjustably attached a threaded bar 100, the lower end of which fits snugly and is splined in the socket of a hollow arm 101, carrying a roller 102. A nut 222 fixes the relative positions of the bar 100 and arm 101. A vertical arm 223 is pivoted at its lower end to a bracket 223$^b$ arising from the bed 3 and is so actuated by the collars 87$^a$ and 87$^b$ on the rod 87, that when the clutch 80 is in the position shown in the drawings, the top of the arm 223 engages the arm 101, holding the cutting wheel free of the blank. When, however, the clutch is in the other position and the direction of the slide motion is reversed, the arm 223 will be swung to the right in Figs. 3, 3$^a$ allowing the roller 102 to follow the cams 96. A foot 223$^a$ is provided at the bottom of arm 223 so that when the arm is thrown up, it will be held in such position against the weight of the cutting wheel and other parts.

The operation is as follows: The machine must first be adjusted for the particular pattern and the particular size and shape of blank to be cut, which is done as follows:—Plates 117 and 119 of the proper size, with fingers 125 of the proper shape, are put on the upper part of the shaft 95 and a plate 128, with the number of slots 134 corresponding to the number of cuts to be made, is attached to its lower part. The plate 159 is adjusted on the bracket 158 and the screw 146 adjusted in the arm 142, so that the blank will be rotated the proper amount as described hereinafter.

A cutting wheel 34 of the correct size and shape is attached to the shaft 33 and the bar 13 is brought to such a position that the arm 32 is approximately horizontal when the cutting wheel comes into contact with the blank. This is done by releasing the set screws 14 in the blocks 11 and rotating the hand wheel 29 which raises or lowers the blocks and the bar by means of the bevel gears 22 and 24 and the worm shafts 18. Having brought the bar to the desired height, it is held in position by clamping the set screws.

Figure 12:
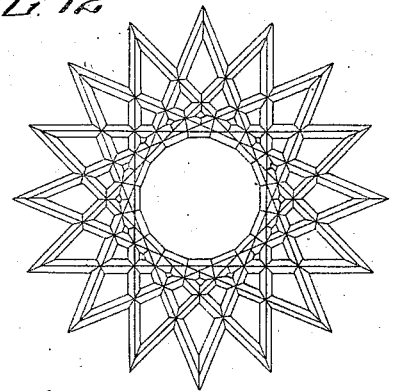
Figure 11:
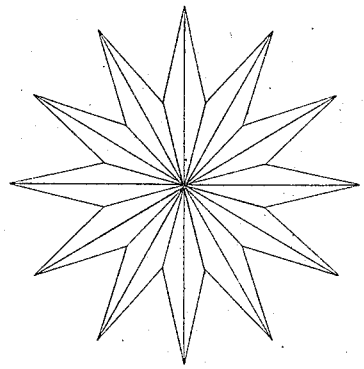
Figure 13:
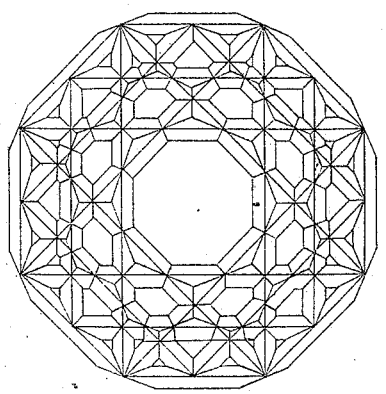
Figure 14:
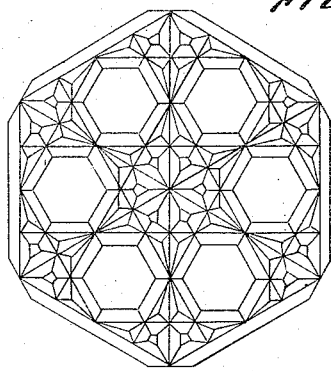

By rotating the hand wheel 30, the bar 13 is also adjusted longitudinally by means of the threads 31, so that the planes of the cutting edges of the cutting wheels are coincident with the axes of the shaft 95 if a design of the character shown in Fig. 11 is to be cut, or eccentric to that axis by the proper amount if a design of the character shown in Figs. 12, 13, and 14 is to be cut. Of course it is understood that when several units are present in the machine the cutting wheels must each be accurately placed so that the distances between them are exactly equal to the distances between the parallel planes in which the axes of the shafts 95 travel.

As the bar 13 is adjusted vertically the weight of the arms 45, of the shaft 47 and of the pulleys 48 and 51 keeps the belt 53 in tension, these parts swinging around the shaft 44. This shaft being axial with the shaft 41, the distance between the pulleys 48 and 50 is constant and the belt 49 is always in tension. As the bar 13 is adjusted longitudinally, the bars 55 force the pulleys 51 along the feather on the shaft 47 so that their faces are always opposite the faces of the pulleys 38. As the bar 13 is adjusted vertically, the clamp between the rod 108 and the collar 110 is loosened and the rod 108 allowed to remain stationary until the proper position is reached when the clamp is again tightened. As the bar 13 is adjusted longitudinally the clamp between the collar 107 and the bar 106 is loosened and the collar allowed to travel on the bar so that the rod 108 will remain vertical, the clamp being again tightened when the proper position is reached. The counterweight 115 is also screwed on the bar 114 in one direction or the other until it counteracts a sufficient part of the weight of the arm 32 and its attached parts to give the correct pressure of the cutting wheel on the blank. As the bar 13 is adjusted longitudinally the bar 100 must be adjusted in the bracket 99 so that the roller 102 is kept in the plane of the cams 96. These cams are then adjusted by means of the screws 97 to give the proper length of cut and the nut 222 is adjusted for the proper depth of cut. The friction wheel 66 is placed in the proper position on its shaft 65 to give the desired speed to the slide 92.

The machine having been thus adjusted for the particular design which it is intended to cut, the operator shifts the main driving belt from the loose pulley 43 to the tight pulley 42. This causes the cutting wheels 34 and the shaft 65 to revolve. The friction wheels 70 and 66 being held out of contact by the spring 73, the former is not put into motion when the machine is first started. The operator then places a blank in the blank holder of one of the cutting units and depresses the pedal 179 until the lever 178 is caught and held by the latch 175 against the action of the spring 73. This, by means of the rod 183 and the parts connected thereto, forces the friction disk 70 against the wheel 66, which causes rotation of the shaft 69. Assuming the parts to be in the positions shown in the drawings, it is seen that the screw 77 is rotated through the gears 74, 78, 79, to move the slide 92 toward the front of the machine (see arrow Fig. 3). When the slide reaches a predetermined position one of the arms 98 strikes one of the collars 87ª clamped to the rod 87, and through the link-work 86, 85, 84, 83, 82, and 81, the clutch 80 is thrown over and the motion of the slide reversed. At the same time the upper end of arm 223 is moved from under the arm 101 which drops, leaving the cutting wheel free to fall. During the motion of the slide resulting from the change in clutch, (which motion is that of the cutting stroke and is toward the back of the machine); the roller 102 rides down on one of the cams 96, allowing the cutting wheel to come into contact with and cut the blank. At the end of the cutting stroke, after the roller has reached the highest part of the other cam, the other arm 98 strikes the collar 87ᵇ, causing the clutch to be thrown back to its original position and also moving the arm 223 up under the arm 102 to support it while the slide is returning to its forward position. In the construction here shown the cutting stroke is the movement of the slide toward the rear, while the movement toward the front, which will be called the return stroke, is merely to position the blank for a new cutting stroke.

It will be noted that the lowering and lifting of the cutting wheel from the blank is not an abrupt movement, but takes place in a curved path determined by the shape of the cams 96, which shape is selected to give the proper slope to the ends of the cut, while the depth of the main portion of the cut is regulated by the elevation given to the lower straight runs (lettered 96ª, Fig. 3ª) of the cams, on which the roller 102 rests during the main portion of the cutting stroke.

During the motion of the slide to its position caused thereby, the blank is rotated through a predetermined arc so that the next cut is made on a different line. This is accomplished as follows:—The direction of motion of the cross head on the return stroke is indicated by the arrow in Fig. 7. The pin 145 strikes the shutter 160 and is deflected sidewise so that the arm 141 pulls the plunger 133 out of the slot 134 in plate 128. The screw 146 is so adjusted that as soon as the plunger clears the slot, the end of the screw impinges upon the pin 150, pushing the arm 148 to the left. By means of the arms 147 and 152 and the pin 149, the arm 153 is rotated to the left, the pawl 155 causing the plate 128 to rotate with it. When the next slot 134ª is thus brought in line with the plunger 133, the pin 145 has reached the end of the shutter 160 and is released. The plunger 133 is then forced into the slot 134ª by the spring 135. It is not necessary to adjust the plate 159 with extreme accuracy so that the plunger will be released when the slot is exactly opposite it, as the plunger and slot being tapered the exact registration will be accomplished automatically. At the same time that the plunger is released the arm 148 is returned to its original position by means of a spring 148ª, against a stop pin 148ᵇ, projecting from the bottom of the slide. In this way the arm 153 is returned to its original position and the pawl 155 engages the next slot. On the cutting stroke the pin 145 strikes the front side of the shutter 160 and pushes it aside against the spring 163, until it flies back into normal position. By the above described operation the blank is turned through a distance determined by the angular spacing of the notches 134, during each return stroke of the slide 92, to cause a new cut to be made on the following cutting stroke.

Normally the ear 167 resting on the disk 128 holds the arm 166 in the position shown by the solid lines in Fig. 5 so that it passes over the projection 170 without touching it. When, however, the disk 128 has been revolved a complete revolution and the blank is set for the last cut, the projection 167 will drop into the slot 164 as shown by the dotted lines. On the cutting stroke the outer end of the arm 166 will strike the upper side of the projection 170 and be raised until the projection is passed when it will drop back to the position shown by the dotted line. On the return stroke after the design has been fully cut, the end of the arm 166 strikes the under side of 170 and raises it together with the arm 169. This pulls the rod 171 upward and, as will be seen from reference to Fig. 4, this action will draw back the latch 175, releasing the lever 178. The spring 73 then pulls the friction disk 70 away from the wheel 66 and the unit is stopped.

The indexing mechanism as shown in the drawings and described above is designed for cutting a symmetrical pattern similar to those shown in Figs. 11 to 14 which necessitates equal spacing of the slots 134 in the plate 128. But unsymmetrical patterns may be cut by having the slots irregularly spaced and a pattern of semi-circular characteristics may be cut by having two slots 164 diametrically opposite each other in the disk 128.

The mechanism above described, is adapted to cutting a single design in one operation, such designs being composed of straight lines and lying on plane or approximately plane surfaces, but in Figs. 15 to 18, I have shown a modification of the indexing mechanism for use on my machine, by means of which a series of such designs may be cut in one operation, the centers of the individual designs being arranged in a circle. This is accomplished by employing a blank holder which has, in lieu of a single axis of rotation, two parallel axes around which the blank may be rotated, the distance between these axes being the radius of the circle on which the design-centers are arranged. By rotating the blank on one axis the design is cut about one center, and by rotating it on the other axis successive design-centers are brought into the proper cutting position.

I have also shown in connection with this form of my improved blank holder, an improved mechanism for rotating and indexing the blank and an improved automatic stop, any or all of which may be used with the machine first described.

In this construction the vertical shaft 95, instead of carrying the blank holder, as in the original machine, carries a cross head 189 which is provided with a longitudinal groove. In this groove fit rectangular blocks 190 and 191, rigidly connected to each other by bars 192. The block 190 supports the upper shaft 95' which carries the plate 119 of the blank holder, and to the top of block 191 is attached a plate 131' to which are fastened the parts corresponding to those supported by the bracket 131 in the construction before described. A longitudinal recess in the cross head 189 gives room for a screw 193 which is locked to the cross head against longitudinal movement and which passes through an internally-threaded lug 194 on the under side of block 191. It is evident that by turning the screw the blocks 190 and 191 may be adjusted to any position on the cross head 189 and they may be secured in such position by set screws or any other usual means.

The index plate or disk 128' and the parts above it may be similar to those before described in connection with the index-plate or disk 128, but means are preferably provided whereby the blank and blank holder may be removed together from the machine and placed in another machine (or another unit of the same machine) in the same relative position. In this way different parts of a complex design may be cut on one blank and the parts be properly grouped without the necessity of centering the blank in a different blank-holder after each operation. This is accomplished by providing the shaft 95' (see Fig. 18) with a socket in which another shaft 195 fits closely but removably, the parts being provided with a keyway and a collar of shaft 195 resting on a flange at the top of shaft 95'.

The two plates 117 and 119 are attached to the shaft 195 as before described. The blank clamp of this construction embodies a threaded portion of the shaft 195 on which screws a collar 196, provided with a handle 197, the plate 119 resting on this collar. When there is no blank in the blank holder, the collar is in such a position that the plates 117 and 119 do not touch. After a blank has been placed in position, the operator turns the handle 197 in the proper position to raise the collar 196 on its threads and clamp plate 119 against 117. The threads are cut in such a direction that when the collar 196 is raised the friction between it and the plate 119 will tend to force the latter around so that it will tighten the grip of the fingers 125 on the blank. If any lateral pressure of the blank against the fingers should occur after the plates are clamped together, movement of the fingers will be resisted by the friction between the two plates. This arrangement provides a much firmer grip on the blank than would be furnished by the spring 127 alone.

As the blank holder has two axes on which the blank may be rotated it follows that there must be two rotating and indexing mechanisms. These are similar in principle to the one before described except that they are actuated electrically instead of mechanically and the two mechanisms are much like each other. In the drawing the several parts of the lower mechanism are designated by numerals without exponents and of the upper by the same numerals with exponents. It will be understood that in the upper mechanism those parts which correspond to parts of the lower mechanism carried by the slide 92, are carried by the blocks 190 and 191 and those parts which correspond to parts of the lower mechanism carried by the indexing plate 128 are carried by the indexing plate 128'. In place of the arm 142 and pin 145, of the previous construction there is a short bar 198 (or 198') connected to the arm 141 (or 141') by a link 199 (or 199') and carrying an adjustable collar 200 (or 200'). This bar passes through a solenoid 201 (or 201') and when an electric current is sent through the solenoid as hereinafter described, the bar is pulled forward and the blank rotated as before described in connection with Figs. 5 to 8. The collar 200 (or 200') stops the movement at the proper position and the parts are released when the electric current is broken.

The arrangement just described has two advantages. First, the position of the upper indexing mechanism being variable, connection to it by electric wires is much simpler than by bars, levers and other mechanical devices which must be adjustable and follow the movable parts. Second, with the indexing mechanism first described, the stroke of the slide must be long enough to cause the pin 145 to pass the entire length of the shutter 160, and in cutting some small designs a stroke as long as this would not otherwise be necessary and time would be wasted.

An arm 260 (or 260') attached to the cylinder 132 (or 132') carries two vertical metal strips 202 (or 202') and on the under side of the index plate 128 (or 128') is a metal contact plate 203 (or 203') which will afford electrical connection between these strips at any desired position of the index plate. Electrical connection to the parts of the upper and lower indexing mechanisms is accomplished by having the shaft 95 hollow and provided with rings 204, separated from each other by insulating material. The necessary wires from the upper indexing mechanism pass down through the hollow shaft and are attached to these rings. By means of brushes 205 attached to the cross-head 92 and bearing on the rings the electric circuits are continued to other parts of the machine irrespective of the position of the cross-head and its attached parts.

In addition to the parts common to the two indexing mechanisms, spring contact plates 207 are carried by the bed 3 in a position to be brought together by the slides 92 or parts carried thereon when the latter are at the limit of their return strokes. The electrical connections of these various parts are shown diagrammatically in Fig. 19. In addition to the parts already described and shown in Figs. 15 to 18, the circuit includes a third solenoid 206 which operates the latch 175 to stop the cutting unit when a design is completed. 208 is any convenient source of current.

If desired, three push buttons 209 may be provided within easy reach of the operator so that he may rotate either index-plate or stop the machine at will. These would be connected to the circuit as shown by the dotted lines.

With the parts in their normal position and a blank in the blank holder the slide 92 is reciprocated under the cutting wheel as before described. Initially all the contacts at 202, 202' and 207 are open, the relation of the plates 203 and 203' to the contacts 202 and 202' being such as results from their having just passed away therefrom in the normal direction of rotation of the indexing plates 128 and 128'. On the first return stroke of the slide 92 the contact 207 is closed, sending a current through the solenoid 201', which thereby actuates the indexing mechanism of the upper plate 128' through the feeding mechanism before described. At this time the solenoid 201 is not energized owing to the fact that its circuit is still open at the contacts 202'. The upper index plate or disk 128' is thus stepped around on each return movement of the slide in accordance with the spacing of the feeding notches therein and this stepping continues until all the cuts around one common center of the blank have been made, these cuts being those of a minor figure in the pattern. When the index plate 128' has thus made a complete revolution lacking one space, the plate 203' thereon closes the contact at 202', and on the return stroke the closure of the contact of the circuit at 207 sends the current through both solenoids 201 and 201'. The closure through the latter solenoid completes the rotation of the blank and index plates 128' around the axis of the shaft 95' of the latter, bringing these parts to their initial position. The closure of the circuit through the solenoid 201 effects a stepping through one space of the lower index plate 128 whereby the parts carried thereby, including the upper index plate 128, and the blank are shifted around the axis of the lower shaft 95. This removes the previously cut design from beneath the cutting wheel and presents a new part of the blank thereto. The final rotation of the upper indexing plate 128' broke the circuit of the solenoid 201 at 202', and further reciprocations of the slide cause the above operation to be repeated, that is to say, results in the upper indexing plate 128' being stepped around upon the axis of its shaft 95' until another pattern, having its center displaced from the center of the previous pattern by an angular distance determined by the spacing of the feeding notches in the lower disk 95, has been cut. Successive patterns are thus cut around a center whose radius is measured by the eccentricity existing between the shafts 95 and 95' until the final movements of the upper indexing plate 128' to complete the last cut in the last pattern closes the circuit at 202'. At this time the contacts 202 have been closed by the plate 203' on the lower indexing plate 128, and not only are circuits established through the solenoids 201 and 201' on the final return stroke of the slide and the closing of the contact 207 caused thereby, but a circuit is also established through the contacts at 202 and 202' in series and through the solenoid 206, which operates in any suitable manner to stop the cutting unit, this taking the place of the plate 170 as a means of actuating the link 171 before described.

It is obvious that in lieu of causing the complete rotation of the upper blank holder between each successive stepping of the lower indexing plate, the wiring connections may be reversed to cause complete rotations of the lower indexing plate intermediate of the movements of the upper indexing plate.

It is evident that by shifting the block 190 to a position where the axis of shaft 95' will coincide with that of shaft 95, and by using only one of the indexing mechanisms, this attachment may be made to cut the same designs as may be cut by the machine as originally described.

When the machine is provided with the blank holder just described, there are the following six variables on which depends the design that will be cut. (1) The length of stroke of the cross-head 92 and the position of the cams 96. (2) The distance between the axis of the shaft 95 and the plane of the cutting wheel. (3) The distance between the axes of the shafts 95 and 95'. (4) The number of slots in the index plate 128 and their spacing. (5) The number of slots in the index plate 128' and their spacing. (6) The size of the cutting wheel and the shape of its cutting edge.

It is readily seen that a great variety of combinations of these six variables may be made, each combination producing a different design.

The mechanism before described is limited to cutting multiple designs of a certain character on a plane or approximately plane surface. I also show an attachment to be used with this machine in place of the holders before described, by means of which designs of the same character may be cut on certain curved surfaces when the individual design units do not cover too great an arc of the curved surface of the blank. Blanks having a circular cross-section in one plane, (as the great majority of cut glass articles have) may be cut with multiple designs of which the individual design-centers lie on one of the circular elements of the blank. Also blanks having a polygonal cross-section in one plane may have multiple designs cut on them, the individual design-units being cut on the flat sides of the blank.

In the device shown in Figs. 22 and 23, the shaft 95 instead of carrying a cross-head 189 as in the device of Figs. 15 to 17, carries a rectangular table 210, which is supported on the cross-head 92 by ball bearings 211 or some similar device. The table carries a slide carriage 212 which is provided with projections 213 fitting into grooves in table 210. By means of a screw 214, the plate may be adjusted to any desired position on the table and clamped thereto by any suitable means. Attached to the plate 212 are two standards 215 which support the trunnions 216, the latter having a bearing 190 which carries the blank holder and to one of the trunnions is also attached the plate 131', which may be similar to that before described, which carries the automatic indexing mechanism. It will thus be seen that with this mechanism the trunnions 216 correspond to the cross-head 189 of the mechanism of Figs. 15 to 17. By means of a segment 217 attached to one of the trunnions and a screw 218 fitting in the corresponding standard, the blank holder and connected parts may be adjusted to any desired angle.

The support of Fig. 24 is similar to the support of Figs. 22 and 23 in principle though changed in detail. The trunnions 216 instead of being attached directly to the bearing 190 carry a rectangular cradle 219, having at each end a bearing 190, 190' attached. Each bearing supports a pair of blank holding plates 117' and 119'. These are held tightly against the interposed blank by means of a spring 220, and may be withdrawn at any time by means of a handle 221. This provides a more rigid support for blanks which are greater in length than in diameter.

By adjustment on the trunnions 216 and on the table 210 any circular element of the blank may be brought tangent to the vertical plane in which the axis of shaft 95 travels in its movement while at the same time the surface of the blank at the point of tangency, (or a plane tangent to the surface at that point) is horizontal. If the plane in which the axis of shaft 95' moves contains also the axis of 95, the high point of the blank will lie on the latter axis. This point therefore will be the center of a design-unit when the shaft 95 is revolved. The carrier, having been thus set, the operation of the machine is the same as before described, successive design centers being brought into the proper cutting position by revolving the blank holder on the shaft 95' as previously described.

The above construction is adapted to cut designs of the character of these shown in Figs. 25 to 27, the construction of Figs. 22 and 23 being used for the first and construction of Fig. 24 for the others.

While I have, in Figs. 22, 23, and 24, shown the work-holders as having only a single vertical axis of motion, in this respect following the construction shown in Figs. 5 to 10, it is obvious that the double vertical axes of Figs. 15, 16, 17, can be employed with the holders of Figs. 22, 23, and 24, in which case the table 120 would be carried by the shaft or the axis 95' of the last-named figures.

For convenience in drawing, only simple twelve-point stars are shown in Figs. 25 and 26, but it is readily understood that many other designs may be cut in a similar manner and as many of them as desired may be cut around the periphery of the blank.

In cutting a design of the character of that shown in Fig. 27, it is easily seen that the shaft 95 will be locked in one position so that the axis of the blank lies in the plane of the cutting wheel. The blank will be rotated on the shaft 95' after each cut and the machine will be stopped when one revolution of the blank has been completed.

Having thus described my invention, what I claim is;—

1. In a glass-cutting machine, the combination with a rotary cutter, of a work holder, means for reciprocating the one past the other, indexing mechanism for the work holder, and means actuated by the reciprocation of the said elements in respect to each other for causing an angular feeding movement in the indexing mechanism.

2. In a glass-cutting machine, the combination with a rotary cutter, of a work holder, means for reciprocating the work-holder past the rotary cutter with a slow speed of feed in one direction and with a fast return stroke in the opposite direction.

3. In a glass-cutting machine, the combination with a rotary cutter, of a work-holder, means for reciprocating the work-holder in respect to the cutter, a removable indexing plate attached to the work holder, and means for feeding the indexing plate through angular distances determined by its characteristics, upon the reciprocation of the work-holder.

4. In a glass-cutting machine the combination with a rotary cutter, of a work-holder, means for reciprocating the work holder in respect to the cutter, an indexing mechanism for the work-holder, means for effecting a movement of the indexing mechanism, and of the work-holder upon the reciprocation of the work holder, means actuated by the indexing mechanism upon the completion of a predetermined angular movement for arresting reciprocation of the work-holder.

5. In a glass-cutting machine, the combination with a rotary cutter, of a work-holder, means for reciprocating the work-holder past the cutter, an indexing mechanism for the work-holder including a removable indexing plate having feeding notches therein corresponding in number and angular displacement to the lines of the design to be cut, and a feeding mechanism engaging therewith, means for actuating the feeding mechanism upon the reciprocation of the holder and means for stopping the reciprocation of the holder upon the completion of a predetermined angular movement of the indexing mechanism.

6. In a glass-cutting machine, the combination with a rotary cutter, of a work holder mounted upon two parallel but separate axes, means for reciprocating the work holder in respect to the cutter, means for indexing the work holder upon one of such axes on the reciprocation of the work holder and means for indexing the work holder around the other axis upon the completion of a predetermined angular movement around the first named axis.

7. In a glass-cutting machine, the combination with a rotary cutter of a work holder mounted upon two parallel but separate axes, means for reciprocating the work holder in respect to the cutter, means for indexing the work holder upon one of such axes on the reciprocation of the holder, and means for indexing the work holder around the other axis upon the completion of a predetermined angular movement around the first named axis, and means for arresting the reciprocation of the work holder on the completion of the rotation of the work holder around the last named axis.

8. In a glass-cutting machine, the combination with a rotary cutter, of a slide, of means for reciprocating said slide, a cross-head axially mounted on the slide, a work holder shiftingly carried by the said cross-head on an axis parallel to the axis on which the cross-head is mounted on the slide, means for indexing the work holder around one of said axes by the reciprocation of the slide, means for indexing the work holder around the other axis upon each completion of a predetermined angular movement of the work holder around the first named axis and means for arresting the reciprocation of the slide upon the completion of a predetermined angular movement of the work holder around its last named axis.

9. In a glass-cutting machine, the combination with a rotary cutter, a work-holder, means for reciprocating blank holder past the cutter, and cams reciprocating with the blank holder and adjustable thereon for lifting the rotary cutter away from the blank-holder at the ends of the stroke.

10. In a glass-cutting machine, the combination with a work-holder of a rotary cutter movable to and from the blank holder, means for reciprocating the work holder in respect to the rotary cutter, means for lifting the cutter away from the blank at the end of one stroke, means for maintaining the cutter raised during the following stroke, and for releasing it at the end of such following stroke.

11. In a glass-cutting machine, the combination with a work-holder, of a rotary cutter movable to and from the work-holder, means for reciprocating the work-holder in respect to the rotary cutter and movable cams with the work-holder and adjustable to and from each other and adapted to limit the movement of the cutter toward the work-holder and to lift the same therefrom at the end of one stroke.

12. In a glass-cutting machine, the combination with a work-holder, of a rotary cutter movable to and from the work-holder, means for reciprocating the work-holder in respect to the rotary cutter, cams movable with the work-holder and adjustable to and from each other and adapted to limit the movement of the cutter toward the work-holder and to lift the same therefrom at the end of one stroke, means for maintaining the cutter raised during the following stroke and for releasing it at the end of such stroke.

13. In a glass-cutting machine, the combination with a rotary cutter, of a work-holder, means for reciprocating the work-holder past the cutter with a speed greater in one direction of movement than in the other, means for holding the cutter away from the work-holder upon the movement of the work holder in the direction of its greater speed, and means for angularly shifting the work holder at the end of each stroke in one direction.

14. In a glass-cutting machine, the combination with a rotary cutter, of a work-holder, a slide upon which the work-holder is carried, means for reciprocating the slide in respect to the cutter, a vertical axis supporting the work-holder, means for automatically indexing the work-holder around the vertical axis, an axis transverse to the first named axis and also carrying the work-holder, and means for indexing the work-holder around its transverse axis.

15. In a glass-cutting machine, the combination with a rotary cutter, of a slide, means for reciprocating the slide in respect to the cutter, a work-holder carried on the slide on a vertical axis and on an axis transverse thereto, automatic means for indexing the work-holder around the vertical axis, and means for indexing the work-holder around the transverse axis.

In testimony whereof I hereunto affix my signature in the presence of two witnesses.

EDWIN HALDEMAN FINNIE.

Witnesses:
HASELL W. BALDWIN,
CHARLES A. McMILLEN.